(12) United States Patent
Fevrier et al.

(10) Patent No.: US 11,062,821 B1
(45) Date of Patent: Jul. 13, 2021

(54) INTERMEDIATE NODE TO POWER SUBMARINE CABLE SYSTEM

(71) Applicant: Facebook, Inc., Menlo Park, CA (US)

(72) Inventors: Herve Albert Pierre Fevrier, Miami, FL (US); Andrew James Palmer-Felgate, Chichester (GB)

(73) Assignee: Facebook, Inc., Menlo Park, CA (US)

( * ) Notice: Subject to any disclaimer, the term of this patent is extended or adjusted under 35 U.S.C. 154(b) by 28 days.

(21) Appl. No.: 16/444,988

(22) Filed: Jun. 18, 2019

(51) Int. Cl.
*H01B 7/14* (2006.01)
*H02J 3/38* (2006.01)

(52) U.S. Cl.
CPC .............. *H01B 7/14* (2013.01); *H02J 3/382* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,481,583 A * | 1/1924 | Anundi | ................. | B63B 22/166 441/16 |
| 2,497,852 A * | 2/1950 | Arenstein | ................. | B63C 9/21 441/11 |
| 3,073,273 A * | 1/1963 | Raistakka | ................. | B63G 8/41 114/327 |
| 3,496,525 A * | 2/1970 | Francis | ..................... | G01S 1/72 367/13 |
| 3,552,132 A * | 1/1971 | Georgii | ................... | B65D 88/78 405/210 |
| 3,946,695 A * | 3/1976 | Isaak | ....................... | B63B 21/24 114/293 |
| 3,953,905 A * | 5/1976 | Paitson | ................... | B63B 22/18 441/17 |
| 4,268,858 A * | 5/1981 | Wood | ..................... | H04N 7/102 348/143 |
| 4,299,260 A * | 11/1981 | Jansen | ..................... | B63B 21/50 137/615 |
| 5,073,136 A * | 12/1991 | DeWitt | ................. | B63B 22/003 441/7 |
| 5,319,376 A * | 6/1994 | Eninger | ................. | B63B 22/003 342/357.4 |
| 5,405,717 A * | 4/1995 | Hasvold | .................. | H01M 6/34 429/119 |
| 5,408,238 A * | 4/1995 | Smith | ................... | B63C 9/0005 342/357.55 |
| 5,449,307 A * | 9/1995 | Fuereder | ................. | B63B 1/047 441/2 |
| 5,644,077 A * | 7/1997 | Fowler | ...................... | B63B 3/04 73/170.29 |
| 5,691,957 A * | 11/1997 | Spiesberger | ............ | G01S 19/14 367/3 |
| 6,093,069 A * | 7/2000 | Schelfhout | ................ | B63C 7/26 441/11 |

(Continued)

*Primary Examiner* — William H. Mayo, III
*Assistant Examiner* — Krystal Robinson
(74) *Attorney, Agent, or Firm* — Van Pelt, Yi & James LLP (57) ABSTRACT

Electrical power in a marine environment is generated using a power generator. The electrical power generated by the power generator is delivered using a power feed equipment. The delivery of the electrical power is via a power switching unit coupled to a submarine cable. The power switching unit selectively provides to at least a portion of the submarine cable the electrical power delivered by the power feed equipment.

20 Claims, 9 Drawing Sheets

(56) References Cited

U.S. PATENT DOCUMENTS

| | | | | |
|---|---|---|---|---|
| 6,175,809 B1* | 1/2001 | Naville | G01V 1/3808 | |
| | | | | 702/14 |
| 6,525,762 B1* | 2/2003 | Mileski | H04N 7/005 | |
| | | | | 348/143 |
| 6,813,218 B1* | 11/2004 | Antonelli | G01S 15/86 | |
| | | | | 367/3 |
| 7,345,705 B2* | 3/2008 | Croasdale | B63G 8/38 | |
| | | | | 348/335 |
| 7,837,525 B2* | 11/2010 | Napolitano | B63B 22/20 | |
| | | | | 441/29 |
| 9,694,874 B1* | 7/2017 | Stackpole | B63G 8/001 | |
| 10,120,087 B2* | 11/2018 | Richer De Forges | | |
| | | | G01V 1/3843 | |
| 10,858,076 B2* | 12/2020 | Hansen | B63B 22/24 | |
| 2004/0251885 A1* | 12/2004 | Liegeois | B64G 1/44 | |
| | | | | 323/282 |
| 2008/0188150 A1* | 8/2008 | Hine | B63H 1/36 | |
| | | | | 441/136 |
| 2008/0190849 A1* | 8/2008 | Vuong | B01D 63/082 | |
| | | | | 210/652 |
| 2009/0309366 A1* | 12/2009 | Moore | F03B 13/1845 | |
| | | | | 290/53 |
| 2011/0049992 A1* | 3/2011 | Sant'Anselmo | H02S 10/12 | |
| | | | | 307/64 |
| 2012/0285544 A1* | 11/2012 | Westby | F03B 13/16 | |
| | | | | 137/1 |
| 2013/0009469 A1* | 1/2013 | Gillett | H02J 3/381 | |
| | | | | 307/25 |
| 2015/0325987 A1* | 11/2015 | Beane | B63B 22/04 | |
| | | | | 405/166 |
| 2016/0322819 A1* | 11/2016 | Kopp | H02J 13/0017 | |
| 2017/0285203 A1* | 10/2017 | Fyffe | G01V 1/3852 | |
| 2017/0328982 A1* | 11/2017 | Jongsma | G01S 5/16 | |
| 2020/0056584 A1* | 2/2020 | Sia | B64C 39/022 | |
| 2020/0270988 A1* | 8/2020 | Wilson | E21B 47/13 | |

* cited by examiner

INTERMEDIATE NODE TO POWER SUBMARINE CABLE SYSTEM

BACKGROUND OF THE INVENTION

Submarine communications cables are laid in the water, e.g., along the sea floor to provide long-distance communications between continents. These specialized cables are designed to withstand harsh underwater conditions but are still susceptible to faults, such as cuts or exposure of the electrical power conductor resulting in disruption of optical and/or power connectivity. A cable fault can potentially bring down system connectivity for weeks or longer and significant effort is required to restore the system's availability. Traditionally, a submarine cable system is designed as a point-to-point connection, connecting one onshore network to another via a submarine cable. In many scenarios, the cable fault is relatively close to shore, for example, within 100 kilometers of shore. There exists a need for a submarine cable system that improves resiliency, especially with respect to optical connection and/or power faults close to shore whilst also maximizing the power available to the amplifiers to achieve optimum optical performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Submarine communications cables can be laid in water, e.g., on the sea floor to provide long-distance communications between continents. For example, a submarine communications cable (an underwater cable, also referred to herein as a submarine cable) can include optical fibers to carry (or guide) optical signals representing data. The optical signals can be generated by transmitters converting electrical signals into pulses of light. As a result, an optical fiber of the submarine cable can guide an optical signal, or light, corresponding to a portion of the electromagnetic spectrum. Many submarine cables use underwater power repeaters and other submerged equipment, such as branching units, to boost the optical signals being transmitted along the submarine cable. The power repeaters and other submerged equipment, such as branching units, can be powered by power feed equipment in cable landing stations (also referred to herein as landing stations, cable stations, power stations, etc.) on either end of the submarine cable (e.g., on different continents). The power feed equipment on the two ends can be configured such that one end provides a positive voltage and the other end provides a negative voltage (with a virtual ground existing somewhere along the submarine cable, e.g., approximately halfway between the two ends), with the electric potential differences generated used to power the power repeaters and other submerged equipment, such as branching units.

A system for delivering power to a submarine cable via an intermediate node is disclosed. The disclosed system comprises a power generator configured to generate electrical power (also referred to herein as power, electricity, energy, electrical energy, etc.) from one or more sources of energy (e.g., solar energy, wind energy, wave energy, tidal energy, thermal energy, etc.) in a marine environment and a power feed equipment configured to deliver, via a power switching unit coupled to the submarine cable, the electrical power generated by the power generator, wherein the power switching unit is configured to selectively provide to at least a portion of the submarine cable the electrical power delivered by the power feed equipment. The generated electrical power can also be stored in a battery included in the system. A practical and technological benefit of the invention disclosed herein is that the invention provides increased resilience against power faults in submarine cables. By having an alternative source of power that can be used in the event of a fault (e.g., a shunt fault, as described below), optical connectivity of the submarine cable can be maintained even under power fault conditions without compromising on the maximum electrical energy that can be applied to the cable.

A shunt fault is a type of fault that occurs when a submarine cable's insulation is damaged, causing a short circuit between the submarine cable (e.g., its electricity conducting metallic components) and seawater. When a shunt fault event occurs, the apparent location of the virtual ground along the submarine cable will move to the shunt fault location. For example, the virtual ground would move away from approximately halfway between cable landing stations (when the cable landing stations provide positive and negative voltages of the same magnitude, such as +V kV and −V kV) to wherever the shunt fault event occurred. A shunt fault event can occur due to damage to the submarine cable from ship anchors, fishing trawlers, seismic activity, currents dragging the submarine cable on the sea floor, and other causes. Shunt fault events often occur close to shore where ship anchors, fishing trawlers, and other sources of potential damage to the submarine cable are more common.

In the example of a positive voltage source operating at +½$V_{max}$ at one cable landing station and a negative voltage source operating at −½$V_{max}$ at the other cable landing station, if a shunt fault event occurs near one of the shores (causing that part of the submarine cable to be a virtual ground), then the total electric potential across the submarine cable with which to power power repeaters and other submerged equipment, such as branching units, in the submarine cable system would be maintained at 1*$V_{max}$ kV voltage difference across the submarine cable but the relative power would be adjusted from each end to move the virtual ground to be coincident with the fault anywhere along the cable. Thus, only half the potential power of the system can be utilized in normal mode of operation (without any cable fault). This reduction in electric potential with which to power power repeaters and other submerged equipment, such as branching units, could result in reduced data carrying capacity for the submarine cable, data traffic outages, and/or significant downtime until the shunt fault is fixed, which could take a significant amount of time (e.g., weeks to months) that depends on several factors (e.g., how soon a ship can arrive at the shunt fault location and weather conditions at the shunt fault location).

As described in further detail herein, the current invention includes a power generator configured to generate electrical power in a marine environment that would mitigate and/or prevent the adverse shunt fault event consequences described above. A further advantage of the current invention is that no redesign of submarine cable system infrastructure is necessary. For example, an approach of increasing voltages generated by cable landing stations to compensate for shunt fault events could require redesign and redeployment of the submarine cable and/or equipment, such as power repeaters and other submerged equipment, such as branching units (e.g., to prevent arcing within the submarine cable repeaters), which would be costly. No such redesign or redeployment is necessary when using the current invention.

In various embodiments, a reconfigurable power network is created using an intermediate power node. During normal operation, power feed equipment from opposing cable landing stations may be used to power a submarine cable with a dual-end feed (e.g., +V kV at one end and −V kV at the other end, up to maximum operating voltages of +$V_{max}$ and −$V_{max}$). Examples of maximum operating voltages+$V_{max}$ and −$V_{max}$ include +15 kV and −15 kV, +9 kV and −9 kV, and other voltage values. These example values are merely illustrative and not restrictive. In various embodiments, during a shunt fault event, an intermediate structure (or structures) with an autonomous, renewable source of energy generation is used to provide power with a magnitude on the order of $V_{max}$ (voltage that a cable landing station could provide). An example of the intermediate structure is a buoy positioned approximately halfway between the two cable landing stations. In various embodiments, the intermediate structure providing power is connected through a connection cable to a power switched branching unit (also referred to herein as a power switching unit) on the sea floor, wherein the intermediate structure and power switching unit are relatively close to each other (e.g., 15-25 km). In various embodiments, the power switching unit is inserted into the trunk/path of the submarine cable system such that during normal operation (absence of any fault event) power is delivered across the submarine cable system as if the power switching unit were not present, but during a fault event (e.g., a shunt fault event), power is delivered to at least a portion of the submarine cable system from the intermediate structure via the power switching unit.

In some embodiments, the intermediate structure is an anchored float (e.g., buoy). In various embodiments, the buoy includes power generation equipment (e.g., solar panels, wave energy generator, etc.), a battery bank to store generated energy, and power feed equipment to deliver power. The buoy may also include communications equipment (e.g., satellite communications equipment) to communicate status information about the buoy and/or sensor measurements made by the buoy, a navigation system/marine vessel collision avoidance system, mooring lines, and other components. In some embodiments, the battery bank and/or other components are suspended mid-water (under the sea surface) or on the seabed in order to isolate the battery bank and/or other components from harsh ocean conditions near the sea surface. As described in further detail herein, it is also possible to have more than one buoy for reliability purposes and/or to handle more than one fault event at the same time.

Figure 1:
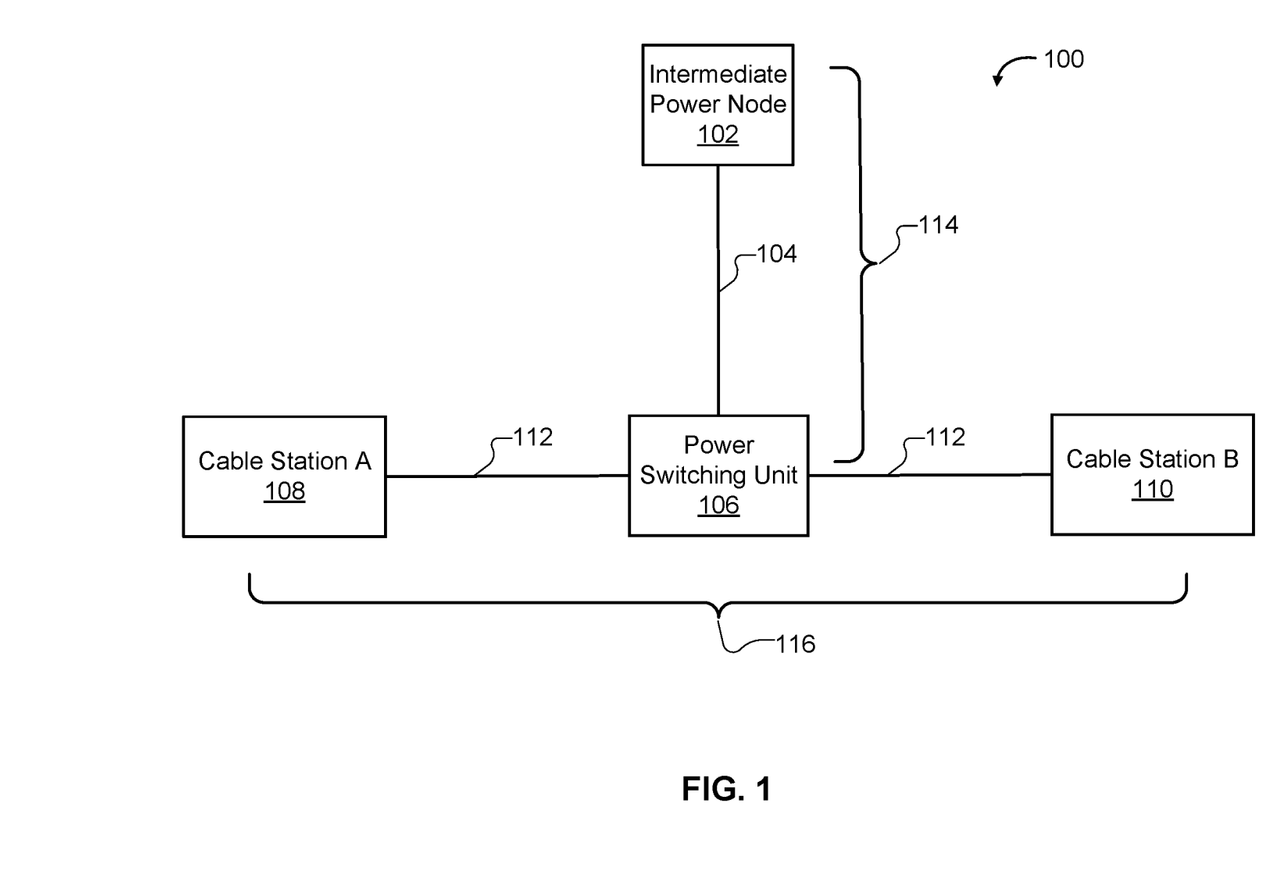
FIG. 1 is a diagram illustrating an embodiment of a submarine cable system with an intermediate power node.

FIG. 1 is a diagram illustrating an embodiment of a submarine cable system with an intermediate power node. In the example shown, submarine cable system 100 includes intermediate power node 102, power switching unit 106, cable station A 108, and cable station B 110. In some embodiments, intermediate power node 102 is a buoy with renewable energy generation and storage functionality. For example, intermediate power node 102 may be a buoy (floating on the sea surface) equipped with solar panels and/or a wave energy generator, a battery bank to store generated energy, and power feed equipment to deliver the generated energy. In various embodiments, the power feed equipment includes converters (e.g., voltage to current converters), switching circuits, electrical interfaces, and other components required to transmit power from one or more energy sources (e.g., solar panels, wave energy generator, battery bank, etc.). In the example shown, connection cable 104 connects intermediate power node 102 and power switching unit 106. In various embodiments, connection cable 104 includes a portion that is made from a conducting material and transmits generated energy from intermediate power node 102 to power switching unit 106. Connection cable 104 may also include a communications line (e.g., fiber optic line) used to communicate with power switching unit 106. In various embodiments, the communications line reports status information associated with submarine cable system 100 and is out of band of the data traffic channel of submarine cable system 100. Further description of a buoy embodiment of intermediate power node 102 is given below with respect to FIGS. 2A-2C.

In various embodiments, power switching unit 106 receives generated energy from intermediate power node 102 and delivers the energy for use by submarine cable system 100. In some embodiments, power switching unit 106 is an electronic switching circuit (e.g., a semiconductor switching circuit comprising a plurality of transistors) that is inserted into the path of a repeated submarine cable on the sea floor. In the example shown, power switching unit 106 is inserted into the path of submarine cable 112. In various embodiments, submarine cable 112 includes a core of a plurality of optical line fiber pairs for data traffic transmission, a conducting layer (e.g., made of copper, aluminum, etc.) for power transmission (e.g., to power repeaters, amplifiers, and/or other electronic equipment in the submarine cable system), and various other layers that provide the submarine cable with physical support and/or protection from environmental elements (e.g., protection from ocean water and damage caused by the sea floor, seismic activity, marine vessels, etc.).

In various embodiments, during normal operation, submarine cable 112 is powered by cable station A 108 and cable station B 110 without assistance from intermediate power node 102 or power switching unit 106. For example, power feed equipment of cable station A 108 and cable station B 110 may be configured to provide at a maximum the $+V_{max}$ and $-V_{max}$ values referred to above, respectively. The power feed equipment may be configured to operate the submarine cable system in constant current mode with a current of approximately 1 amp. In various embodiments, cable station A 108 and cable station B 110 are located on land. Distance 116 between cable station A 108 and cable station B 110 may be very large (e.g., 5,000 to 15,000 kilometers) compared to distance 114 between intermediate power node 102 and power switching unit 106 (e.g., 5 to 30 kilometers).

In various embodiments, intermediate power node 102, connection cable 104, and power switching unit 106 support submarine cable system 100 during a shunt fault event of submarine cable 112. For example, if a shunt fault event occurs in the portion of submarine cable 112 on the cable station A 108 side, power switching unit 106 may connect that portion of submarine cable 112 to intermediate power node 102 and the portion of submarine cable 112 on the cable station B 110 side to ground. Analogously, if a shunt fault event occurs in the portion of submarine cable 112 on the cable station B 110 side, power switching unit 106 may connect that portion of submarine cable 112 to intermediate power node 102 and the portion of submarine cable 112 on the cable station A 108 side to ground. Further details on the operation of submarine cable system 100 during normal operation and during a shunt fault event is given with respect to FIGS. 3A-3C.

In the example illustrated in FIG. 1, portions of the system connections between the components are shown. Other connections may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. Components not shown in FIG. 1 may also exist. For example, repeaters, amplifiers, and other electronic equipment associated with submarine cable 112 have been omitted from FIG. 1 to illustrate the example clearly.

Figure 2A:
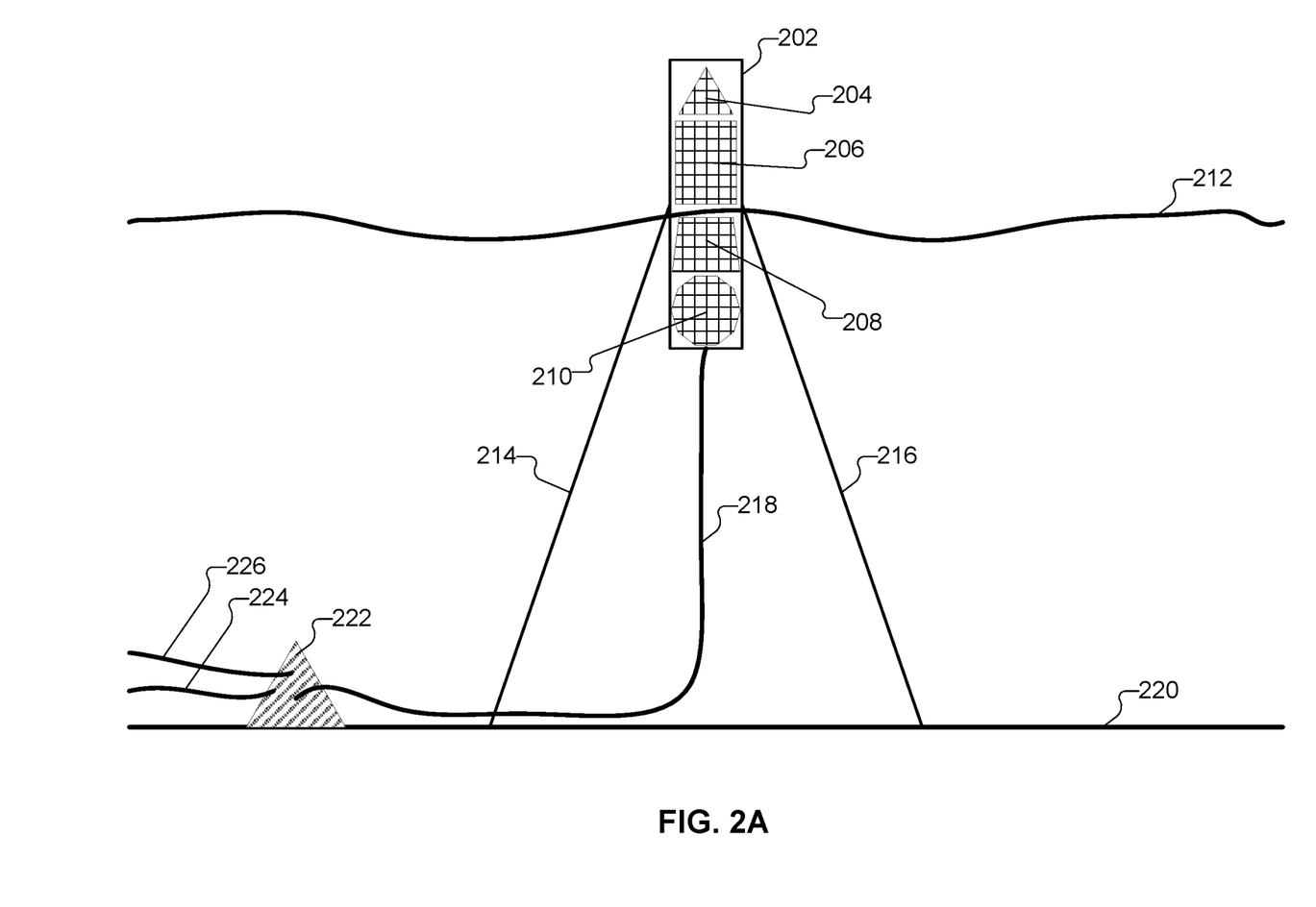
FIGS. 2A-2C are diagrams illustrating embodiments of buoy intermediate power nodes.
Figure 2B:
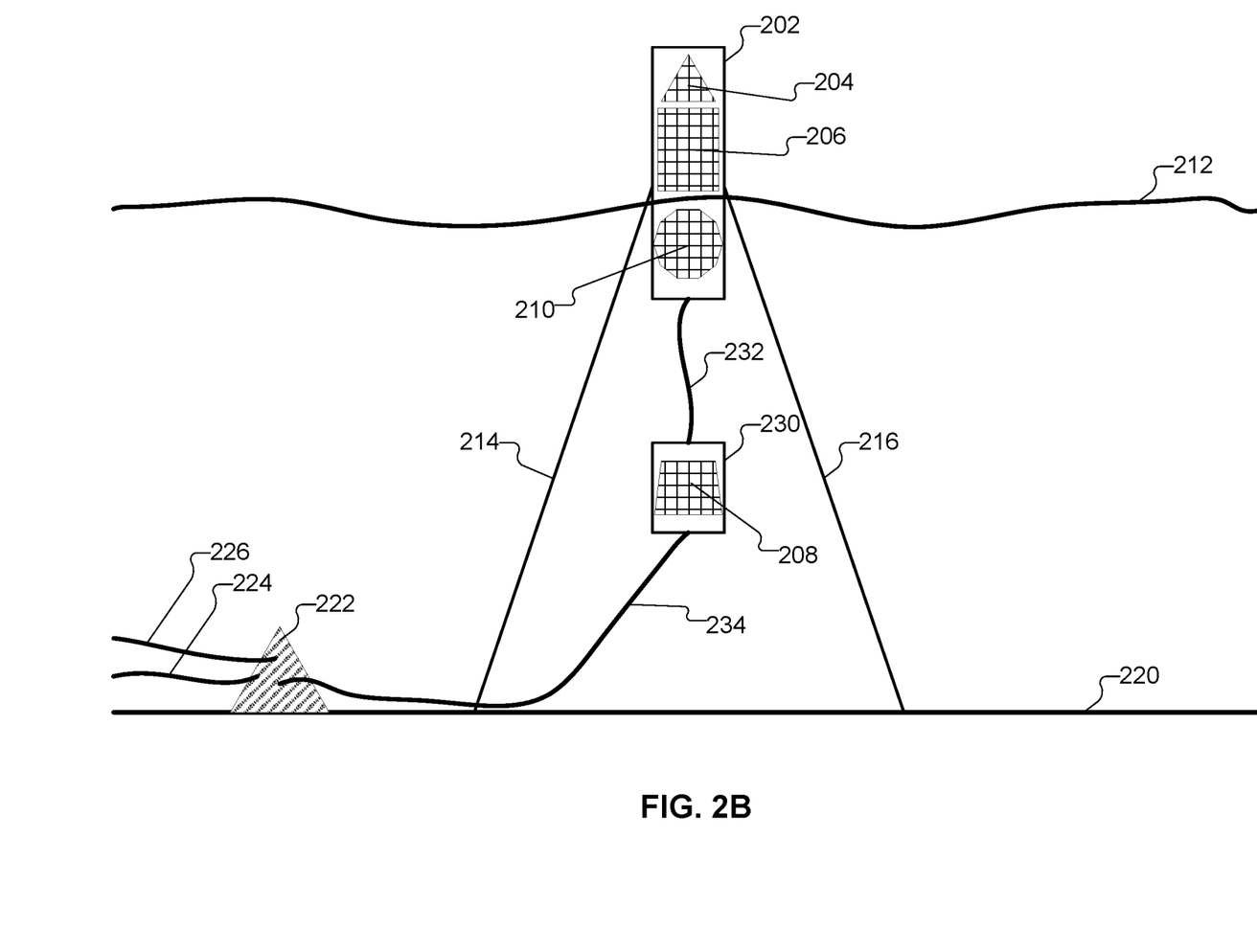
Figure 2C:
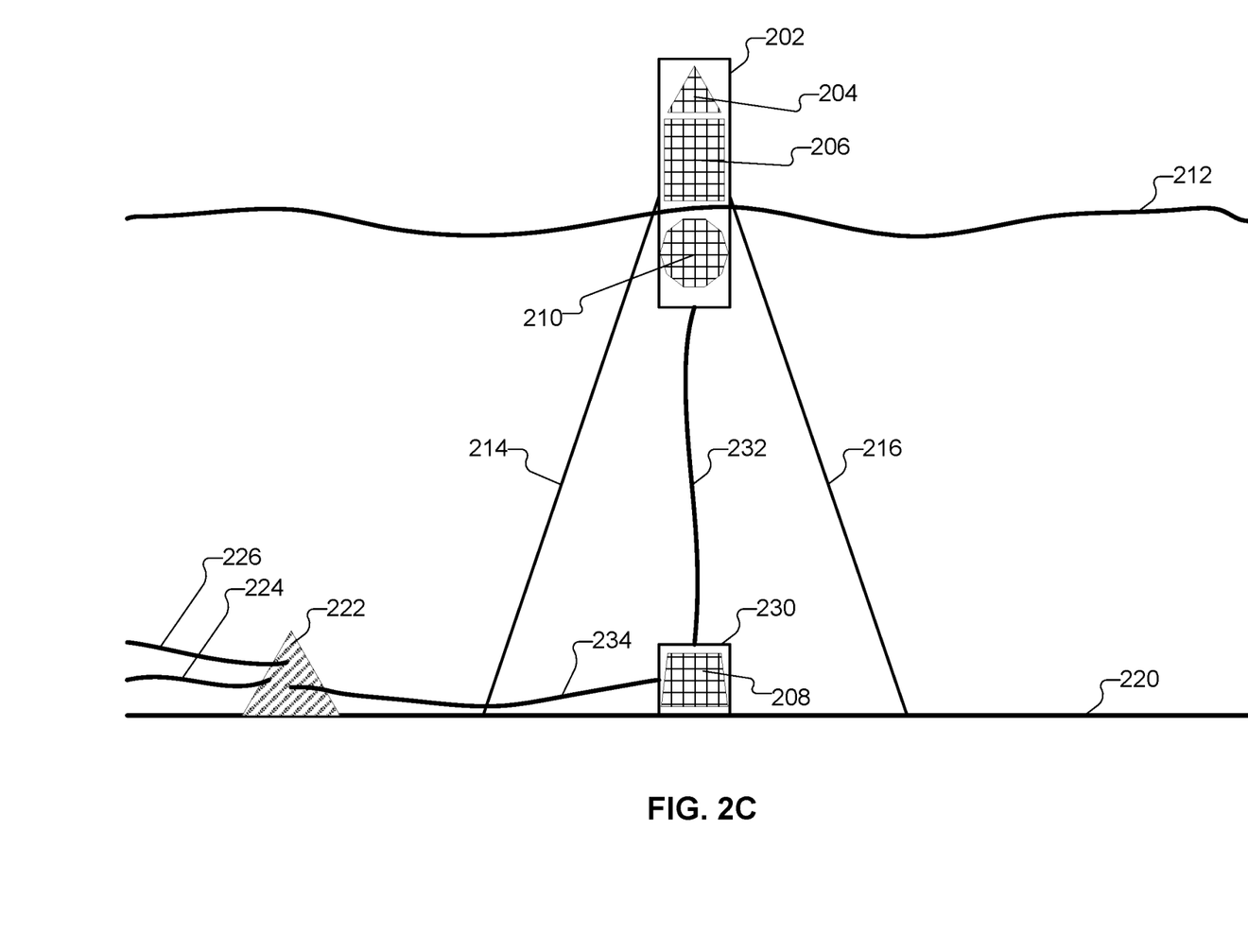

FIGS. 2A-2C are diagrams illustrating embodiments of buoy intermediate power nodes. In the example shown in FIG. 2A, buoy 202 floats on sea surface 212 and includes communications/navigation equipment 204, solar panels 206, battery bank/power feed equipment 208, and wave energy generator 210. In some embodiments, buoy 202 is intermediate power node 102 of FIG. 1. In the example shown, buoy 202 is moored to sea floor 220 by mooring lines 214, 216. Mooring lines 214, 216 are made from durable materials able to withstand deep sea conditions. For example, mooring lines 214, 216 may be may of synthetic materials (e.g., polyester, polyethylene, etc.), metallic materials (e.g., steel), and/or combinations thereof. In some embodiments, anchors (e.g., permanent metallic anchors) are attached to the ends of mooring lines 214, 216 and rest on sea floor 220.

In various embodiments, buoy 202 is linked electrically to power switching unit 222 by connection cable 218. In some embodiments, connection cable 218 is connection cable 104 of FIG. 1, and power switching unit 222 is power switching unit 106 of FIG. 1. Connection cable 218 may be used to deliver power generated by buoy 202 to a submarine cable via power switching unit 222 so that power generated by buoy 202 can be channeled in two submarine cable directions (e.g., using a dual conductor cable). In various embodiments, power switching unit 222 comprises four terminals: a ground terminal and terminals with connections to the submarine cable in two directions and to the buoy power source).

In various embodiments, buoy 202 is located a relatively short distance from power switching unit 222 (relative compared to the length of a submarine cable between landing stations). For example, in an area of the ocean with a water depth of approximately 4 km, buoy 202 may be located approximately 20 km from power switching unit 222 (connection cable 218 would need to be at least 20 km long in this scenario). In some embodiments, buoy 202 is a spar buoy. State alternatively, in some embodiments, buoy 202 is a vertical floating cylinder that is commonly used to house equipment for making oceanographic measurements.

In the example shown, power switching unit 222 can connect connection cable 218 to submarine cable portions 224, 226. In some embodiments, submarine cable portions 224, 226 are portions of submarine cable 112 of FIG. 1. For example, submarine cable portion 224 may be the portion of the submarine cable (from a first landing station on a first land mass) that passes into power switching unit 222 and exits as submarine cable portion 226 (to go to a second landing station on a second land mass). Connection cable 218 may also include communications lines, that are out of band of data traffic channels of the submarine cable, that transmit status information about the submarine cable system (e.g., regarding statuses of repeaters/amplifiers, voltages across the submarine cable, etc.) received by power switching unit 222 to buoy 202. This information may then be reported by buoy 202 via wireless uplink to a satellite communications network. The out of band communications lines may also connect to landing stations to allow for communication between buoy 202 and the shore without using satellite communications.

In some embodiments, communications/navigation equipment 204 includes a transmitter configured to send radio telecommunications signals to a satellite. A receiver may also be included to allow for two-way communication. The transmitter may send status information associated with buoy 202 (equipment functional status, error status/troubleshooting data, battery health, amount of energy generated over a specified period, etc.) and/or the submarine cable system (e.g., regarding statuses of repeaters/amplifiers, voltages across the submarine cable, etc.) to a satellite. Other information collected by various sensors (not shown in FIG. 2A) may also be sent, e.g., buoy location, air temperature, sea temperature, salinity, ocean current measurements, etc.

In some embodiments, communications/navigation equipment 204 includes a very high frequency (VHF) radio transmitter and/or receiver, which may be used, for example, to broadcast collision avoidance messages and/or otherwise communicate with nearby marine vessels. For example, VHF signals broadcasting buoy 202's identity (as a buoy/object to avoid colliding with) may be part of an automated information system (AIS) designed to prevent marine vessel collisions. Buoy 202 may also include an optical device (e.g., flashing/pulsing light) that alerts marine vessels to avoid colliding with buoy 202. In various embodiments, communications/navigation equipment 204 is located in the portion of buoy 202 that is above sea surface 212 because such equipment would not perform effectively from underwater (e.g., communications signals would not travel well through water).

In the example shown, buoy 202 derives renewable energy from solar panels 206. As shown, solar panels 206 are above sea surface 212 in order to directly receive sunlight. Photovoltaic cells comprising solar panels 206 convert solar energy into electrical energy that is stored in the battery bank portion of battery bank/power feed equipment 208. The example shown also includes wave energy generator 210 as a source of renewable energy. In various embodiments, wave energy generator 210 converts kinetic energy of waves into a mechanical motion that generates electricity via electromagnetic induction. For example, the rising and falling of buoy 202 on sea surface 212 may be converted to electrical energy via a linear generator, a generator driven by a mechanical linear-to-rotary converter, a hydraulic pump, and so forth. Other electromagnetic induction methods are also possible. The example illustrated in FIG. 2A is merely illustrative. Alternative arrangements of components in FIG. 2A may also exist. For example, renewable energy sources other than solar panels and wave energy generators are also possible (e.g., wind energy, tidal energy, thermal energy—difference of temperature between the water temperature at the ocean surface and beneath the ocean surface, etc.). In addition, a single type of renewable energy source may be used (e.g., solar or wave energy) instead of both solar and wave energy as illustrated; however, a hybrid of sources would deliver a more stable and continuous supply.

In some embodiments, electrical energy generated by solar panels 206 and wave energy generator 210 is stored in the battery bank portion of battery bank/power feed equipment 208. In some configurations, it may be possible for the battery bank to be kept charged by a land station (e.g., cable station A 108 and cable station B 110 of FIG. 1) via connection cable 218 when a connection path from the land station is available. This may the case when there is no shunt fault event. When there is a shunt fault event, in various embodiments, the battery bank is kept charged by buoy 202's renewable energy sources, and the battery bank powers the portion of the submarine cable experiencing the shunt fault event. The battery bank provides energy when energy generation of buoy 202 is interrupted (e.g., during night when there is no sunlight for solar energy generation and during calms seas when there are no waves for wave energy generation).

In some embodiments, a plurality of buoys similar to buoy 202 are connected to the trunk segment in close proximity. This arrangement provides redundancy in case a buoy fails to function and can provide additional energy to power the submarine cable. In some embodiments, in another configuration, two separate nodes (not connected to each other and separated by a short unrepeated distance) can deliver power to separate portions of the submarine cable. For example, if there are two shunt fault events, one near the shore close to cable station A 108 of FIG. 1 and one near the shore close to cable station B 110 of FIG. 1, one buoy may power the portion of the submarine cable between cable station A and power switching unit 222 and the other buoy may power the portion of the submarine cable between power switching unit 222 and cable station B. Having two buoys in this configuration allows for powering of the submarine cable in case two shunt fault events on opposite shores occur at the same time. Further description of power delivery to different portions of a submarine cable during a shunt fault event is given with respect to FIGS. 3B and 3C.

FIG. 2B illustrates an embodiment of a buoy intermediate power node in which battery bank/power feed equipment 208 is suspended mid-water instead of floated near sea surface 212 with the rest of buoy 202. As shown in FIG. 2B, battery bank/power feed equipment 208 is enclosed in enclosure 230. In FIG. 2B, as is the case in FIG. 2A, buoy 202 floats on sea surface 212 and includes communications/navigation equipment 204, solar panels 206, and wave energy generator 210. Furthermore, as is the case in FIG. 2A, buoy 202 is moored to sea floor 220 by mooring lines 214, 216 and delivers power to submarine cable portion 224 or 226 via power switching unit 222. In contrast to FIG. 2A, in FIG. 2B, battery bank/power feed equipment 208 is located mid-water in enclosure 230. The battery bank and/or power feed equipment may be placed mid-water in order to isolate the battery bank and/or power feed equipment from rough ocean conditions near the sea surface.

In some embodiments, connection cable portion 232 transfers energy generated (e.g., from solar panels 206 and/or wave energy generator 210) to the battery bank. In some embodiments, connection cable portion 234 delivers the generated energy (stored in the battery bank or otherwise) to a submarine cable via power switching unit 222. As shown in FIG. 2B, buoy 202 and the mid-water suspended battery bank and/or power feed equipment are linked electrically to power switching unit 222 by connection cable portions 232, 234. Similar to connection cable 218 in FIG. 2A, connection cable portions 232, 234 may also include communications lines, that are out of band of data traffic channels of the submarine cable, that transmit status information about the submarine cable system (e.g., regarding statuses of repeaters/amplifiers, voltages across the submarine cable, etc.) received by power switching unit 222 to buoy 202. This information may then be reported by buoy 202 via wireless uplink to a satellite communications network. The out of band communications lines may also connect to landing stations to allow for communication between buoy 202 and the shore without using satellite communications.

The power feed equipment of battery bank/power feed equipment 208 may also be placed with buoy 202 near sea surface 212 instead of suspended mid-water in enclosure 230 with the battery bank. If the power feed equipment is located in buoy 202 instead of in enclosure 230, energy stored in the battery bank to be delivered to power switching unit 222 may be routed to buoy 202 and then delivered to power switching unit 222, and connection cable portion 234 could connect buoy 202 (instead of enclosure 230) to power switching unit 222. Other configurations are also possible. For example, power feed equipment may be placed in both buoy 202 (for delivery of power directly generated by solar panels 206 and/or wave energy generator 210) and enclosure 230 (for delivery of power from the battery bank), in which case, a direct power connection from buoy 202 to power switching unit 222 could be used.

FIG. 2C illustrates an embodiment of a buoy intermediate power node in which enclosure 230 is located (e.g., attached) to sea floor 220 instead of suspended mid-water (as is shown in FIG. 2B). In all other aspects, the embodiment illustrated in FIG. 2C is similar to the embodiment illustrated in FIG. 2B, including the possible alternative power transfer and connection cable configurations discussed above. Enclosure 230 may be placed on the sea floor in order to further protect battery bank and/or power feed equipment 208 from harsh ocean conditions.

Figure 3A:
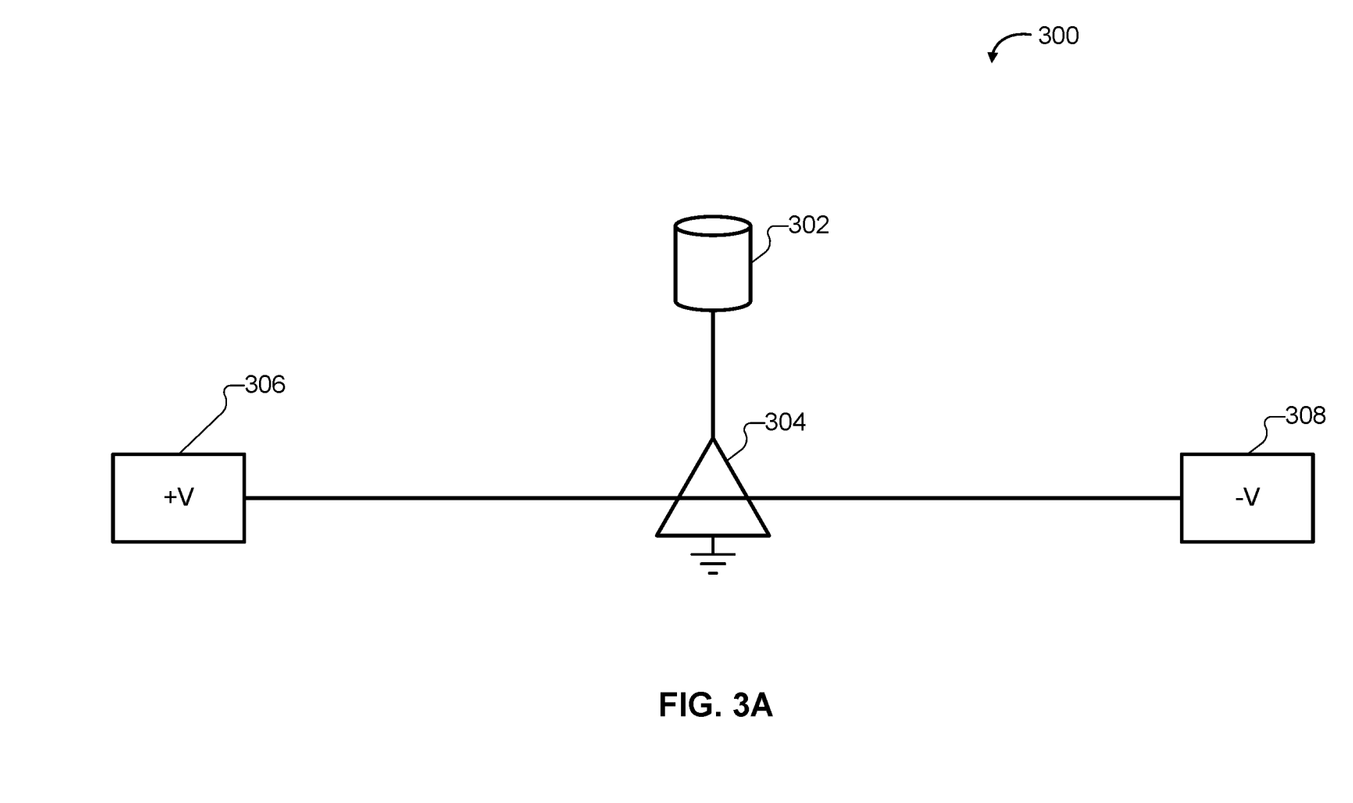
FIGS. 3A-3C are diagrams illustrating operation of an intermediate power node when there is no shunt fault event and when there is a shunt fault event.
Figure 3B:
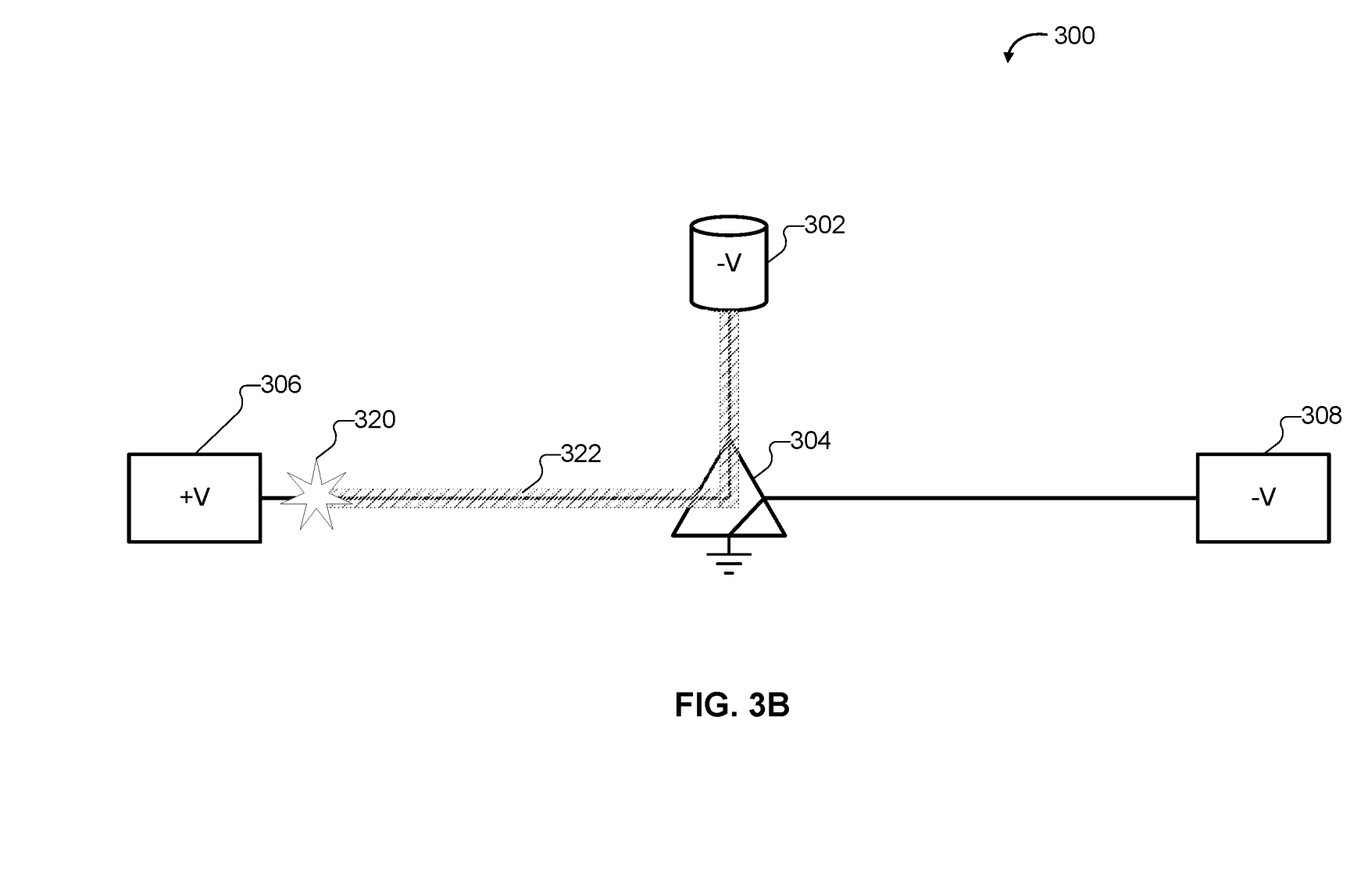
Figure 3C:
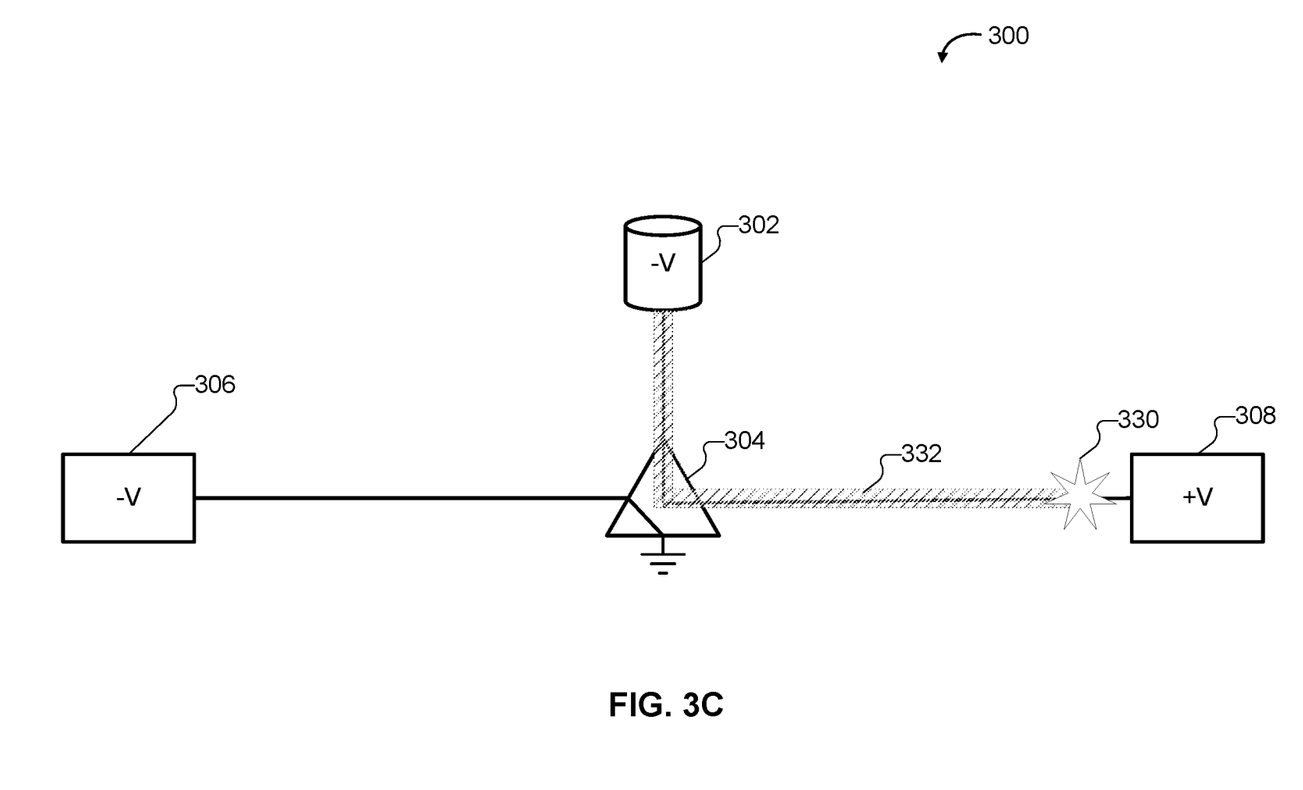

FIGS. 3A-3C are diagrams illustrating operation of an intermediate power node when there is no shunt fault event and when there is a shunt fault event. FIG. 3A illustrates operation of a submarine cable system including an intermediate power node under normal conditions (absence of a shunt fault event). Submarine cable system 300 includes intermediate power node 302, power switching unit 304, power station 306, and power station 308. In some embodiments, intermediate power node 302 is intermediate power node 102 of FIG. 1 or buoy 202 of FIGS. 2A-2C. In some embodiments, power switching unit 304 is power switching unit 106 of FIG. 1 or power switching unit 222 of FIGS. 2A-2C. In some embodiments, power station 306 is cable station A 108 of FIG. 1. In some embodiments, power station 308 is cable station B 110 of FIG. 1. In various embodiments, intermediate power node 302 and power switching unit 304 are located approximately halfway between power station 306 and power station 308.

In the example shown, power station 306 provides a voltage of +V kV, and power station 308 provides a voltage of −V kV to power a submarine cable. A virtual ground would be located approximately halfway between power station 306 and power station 308 along the submarine cable. It would also be possible for power station 306 to provide a voltage of −V kV and power station 308 to provide a voltage of +V kV. In the example shown, under normal conditions (absence of a shunt fault event), power flow is uninterrupted between power station 306 and power station 308, and intermediate power node 302 and power switching unit 304 do not actively play a role in the operation of submarine cable system 300. Stated alternatively, under normal conditions (absence of a shunt fault event), power passes through power switching unit 304 along the submarine cable, and intermediate power node 302 is not connected to the submarine cable by power switching unit 304. As shown in FIGS. 3A-3C, the connections are power connections (to power repeaters, amplifiers, and/or other electronic equipment along the submarine cable). The data traffic carrying fiber optic portion of the submarine cable is not affected by the intermediate power node and power switching unit and is omitted for clarity of illustration.

FIG. 3B illustrates operation of submarine cable system 300 during a shunt fault event occurring along the portion of the submarine cable between power station 306 and power switching unit 304. In the example shown, shunt fault event 320 occurs near power station 306 (e.g., near the shore close to power station 306). Shunt fault event 320 would move the apparent location of the virtual ground in the submarine cable from approximately halfway between power station 306 and power station 308 to the shunt fault location (e.g., near the shore close to power station 306). This would require the length of the submarine cable from shunt fault event 320 to power station 308 to be powered by the V kV electric potential difference between the virtual ground at shunt fault event 320 and power station 308, which is approximately half of the original 2*V kV electric potential difference between power station 306 and power station 308 (2*V kV difference between +V kV and −V kV). This reduction in electric potential with which to power repeaters, amplifiers, and/or other equipment could result in reduced data carrying capacity for the submarine cable, data traffic outages, and/or significant downtime until the shunt fault is fixed.

In the example shown, in order to address shunt fault event 320, intermediate power node 302 (at −V kV in this example) delivers power to the portion of the submarine cable between shunt fault event 320 and power switching unit 304. This is illustrated as power flow 322. In the example shown, intermediate power node 302 is powering through power switching unit 304 to the location of the shunt fault event, and power station 308 is powering to ground at power switching unit 304. This is possible because, in various embodiments, power switching unit 304 has its own ground terminal and is configured so that power station 306 and power station 308 have three connection options: to intermediate power node 302, to ground in power switching unit 304, and to each other (in the absence of a shunt fault event).

With the configuration shown in FIG. 3B, V kV of electric potential is available to power the portion of the submarine cable between power switching unit 304 and power station 308 (approximately the same as in the absence of a shunt fault event) and V kV is available to power the portion of the submarine cable between the shunt fault event location and power switching unit 304 (greater than or equal to what is available in the absence of a shunt fault event). In the example shown, the portion of the submarine cable between power station 306 and the shunt fault event location may be powered by the electric potential difference between the voltage at power station 306 and the virtual ground at the shunt fault event location. The magnitude of the voltage at power station 306 may be lowered (e.g., less than V kV in magnitude) given that the portion of the submarine cable to power is relatively short (e.g., when the shunt fault event occurs close to power station 306). Thus, in the example shown, the shunt fault is balanced out by introducing an additional power source, and reduction of data carrying capacity for the submarine cable is avoided.

FIG. 3C illustrates operation of submarine cable system 300 during a shunt fault event occurring along the portion of the submarine cable between power switching unit 304 and power station 308. FIG. 3C is analogous to FIG. 3B, the difference being the location of the shunt fault event and, consequently, the response to the shunt fault event by intermediate power node 302 and power switching unit 304. In the example shown, shunt fault event 330 occurs close to power station 308, and thus, power node 302 delivers power to the portion of the submarine cable between power switching unit 304 and shunt fault event 330. This is illustrated as power flow 332. In the example shown, intermediate power node 302 is powering through power switching unit 304 to the location of the shunt fault event, and power station 306 is powering to ground at power switching unit 304.

It is also possible to handle two shunt fault events coinciding with each other. For example, if shunt fault events occur along the submarine cable near power station 306 and power station 308, the shunt fault events may be handled with a submarine cable system comprising two intermediate power nodes (not shown). Two buoys capable of generating energy may be positioned near each other approximately halfway between power station 306 and power station 308. One intermediate power node could deliver power to the portion of the submarine cable between power switching unit 304 and one of the shunt fault event locations, and the other intermediate power node could deliver power to the portion of the submarine cable between power switching unit 304 and the other shunt fault event location.

Figure 4:
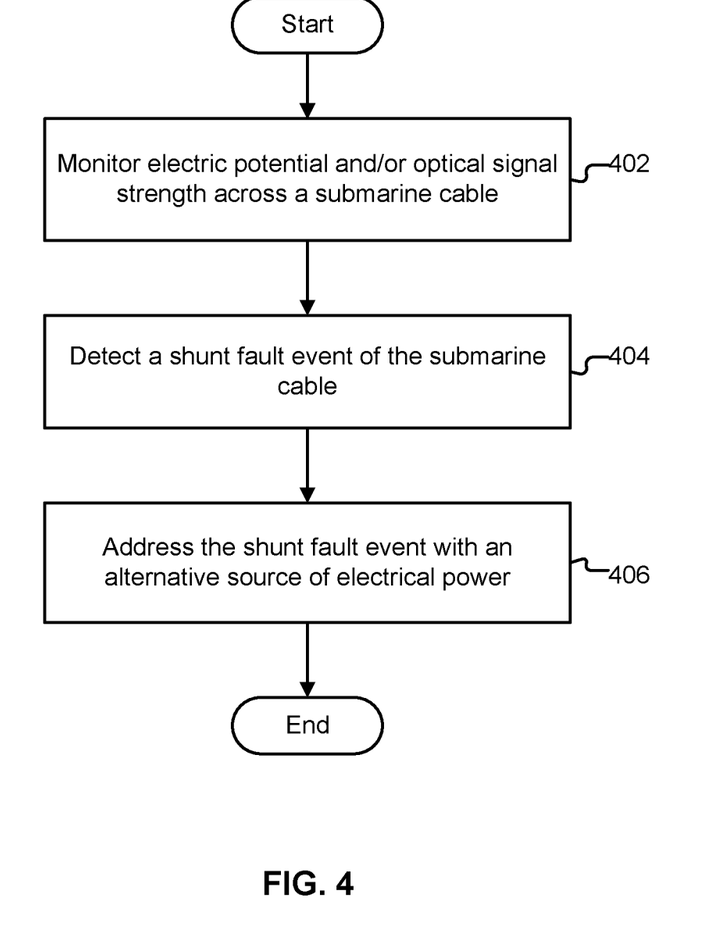
FIG. 4 is a flow chart illustrating an embodiment of a process for responding to a shunt fault event of a submarine cable.

FIG. 4 is a flow chart illustrating an embodiment of a process for responding to a shunt fault event of a submarine cable. In some embodiments, the process of FIG. 4 is performed by submarine cable system 100 of FIG. 1 or submarine cable system 300 of FIGS. 3A-3C. In some embodiments, at least a portion of the process of FIG. 4 is performed by buoy 202 and/or power switching unit 222 of FIGS. 2A-2C.

At 402, electric potential and/or optical signal strength across a submarine cable is monitored. For example, electrical potential may be monitored by sensors (e.g., voltage meters) positioned along the submarine cable. In some embodiments, measurements made by the sensors are reported to an intermediate power node (e.g., a buoy intermediate power node) via a power switching unit. In some embodiments, the sensors are part of other electrical equipment along the submarine cable (e.g., power repeaters and other submerged equipment, such as branching units). Optical signal strength (associated with one or more data-carrying fiber optic lines) may also be measured (e.g., using sensors associated with repeaters, amplifiers, and/or other equipment). For example, a repeater may output signal-to-noise ratios associated with optical signal strength at specified locations along the submarine cable.

At 404, a shunt fault event of the submarine cable is detected. In some embodiments, a shunt fault event is detected by determining whether electric potential at specified locations along the submarine cable fall below a specified threshold. For example, if the electric potential is zero or approximately zero at locations of the submarine cable where the electric potential is not expected to be zero or approximately zero (e.g., not near the expected virtual ground location), it may be determined that a shunt fault event has occurred where the electric potential is zero or approximately zero. Similarly, if optical strength (e.g., as measured by signal-to-noise ratio) is low at a location along the submarine cable (indicating a repeater or amplifier at that location lacks sufficient power), it may be determined that a shunt fault event has occurred at that location.

At 406, the shunt fault event is addressed with an alternative source of electrical power. An example alternative source of electrical power is an intermediate power node that can deliver power to the location of the shunt fault event. In various embodiments, the alternative source of electrical power is located near where the virtual ground of the submarine cable is located when there is no shunt fault event (e.g., approximately halfway between cable landing stations on opposing land masses). In some embodiments, the alternative source of electrical power is a buoy (e.g., buoy 202 of FIGS. 2A-2C) that generates solar energy and/or wave energy. In some embodiments, the buoy is connected to the submarine cable by a connection cable, and the connection cable and the submarine cable converge at a power switching unit (e.g., power switching unit 106 of FIG. 1, power switching unit 222 of FIGS. 2A-2C, or power switching unit 304 of FIGS. 3A-3C).

Figure 5:
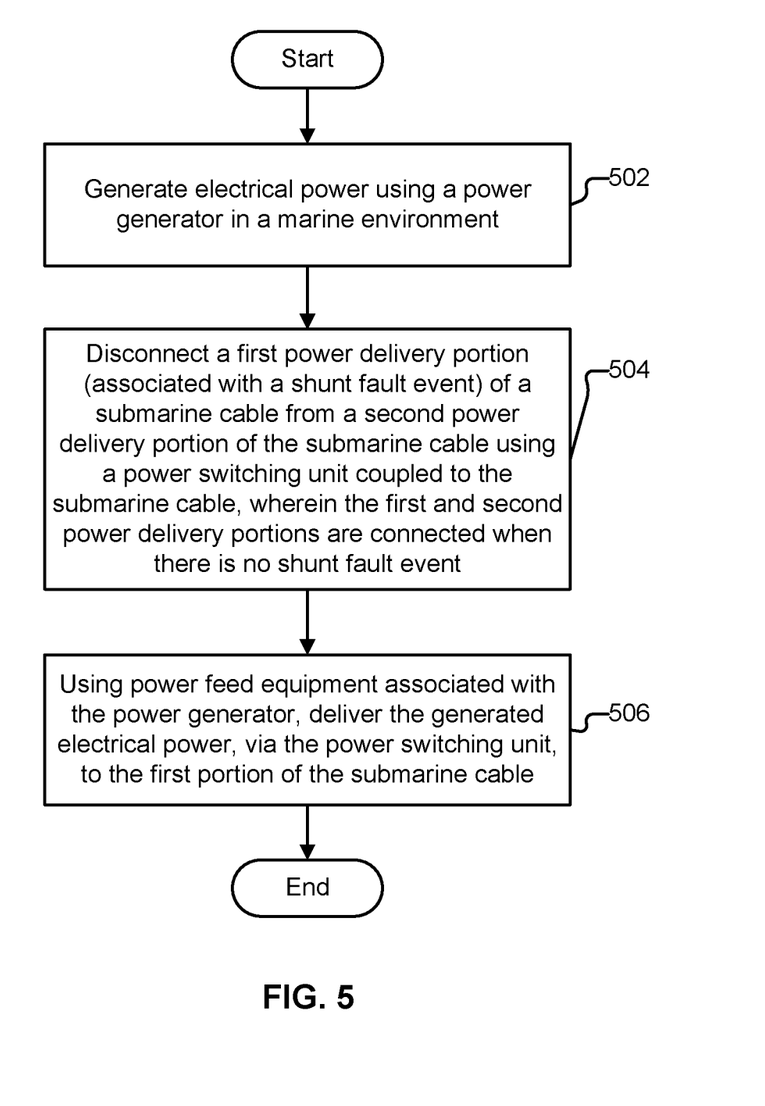
FIG. 5 is a flow chart illustrating an embodiment of a process for addressing a shunt fault event by using an alternative source of electrical power.

FIG. 5 is a flow chart illustrating an embodiment of a process for addressing a shunt fault event by using an alternative source of electrical power. In some embodiments, the process of FIG. 5 is performed by intermediate power node 102 and power switching unit 106 of FIG. 1. In some embodiments, the process of FIG. 5 is performed by buoy 202 and power switching unit 222 of FIGS. 2A-2C. In some embodiments, the process of FIG. 5 is performed by intermediate power node 302 and power switching unit 304 of FIGS. 3A-3C. In some embodiments, at least a portion of the process of FIG. 5 is performed in 406 of FIG. 4.

At 502, electrical power is generated using a power generator in a marine environment. In some embodiments, the power is generator using solar panels and/or a wave energy generator (e.g., solar panels 206 and/or wave energy generator 210 of buoy 202 of FIGS. 2A-2C). In various embodiments, a connection cable delivers the generated electrical power to a submarine cable via a power switching unit.

At 504, a first power delivery portion (associated with a shunt fault event) of a submarine cable is disconnected from a second power delivery portion of the submarine cable using a power switching unit coupled to the submarine cable, wherein the first and second power delivery portions are connected when there is no shunt fault event. For example, the first power delivery portion of the submarine cable may be the power-carrying part of the submarine cable originating from a first cable landing station, and the second power delivery portion of the submarine cable may be the power-carrying part of the submarine cable originating from a second cable landing station. During normal operation (absence of a shunt fault event), the two power-carrying parts would be connected. In various embodiments, during a shunt fault event affecting one of the power-carrying parts, the two power-carrying parts are disconnected from each other and isolated using a power switching unit (e.g., see FIGS. 3B and 3C). In some embodiments, the power-carrying part of the submarine cable not affected by the shunt fault event is powered to ground through the power switching unit.

At 506, power feed equipment associated with the power generator is used to deliver the generated electrical power to the first portion of the submarine cable (where the shunt fault event occurred) via the power switching unit. For example, power feed equipment of buoy 202 of FIGS. 2A-2C may deliver electrical power generated by buoy 202 to the power-carrying part of the submarine cable affected by the shunt fault event.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a power generator configured to generate electrical power derived from one or more sources of energy, in a marine environment; and
 a power feed equipment electrically coupled to the power generator, wherein the power feed equipment is configured to receive the electrical power generated by the power generator and deliver, via a power connection cable, the electrical power generated by the power generator to a power switching unit configured to be located in the marine environment;
 wherein the power switching unit is configured to selectively provide to at least a portion of a submarine cable routed through the power switching unit the electrical power delivered by the power feed equipment.

2. The system of claim 1, wherein the power feed equipment is configured to deliver the electrical power during a shunt fault event of the submarine cable.

3. The system of claim 1, wherein the power switching unit is configured to, during a shunt fault event of the submarine cable, electrically disconnect a first segment of the submarine cable from a second segment of the submarine cable, electrically connect the first segment of the submarine cable to the power connection cable generator, and electrically connect the second segment of the submarine cable to an electrical ground.

4. The system of claim 1, wherein the system is included in or coupled to a buoy floating in the marine environment.

5. The system of claim 4, wherein the buoy is restricted from drifting by one or more mooring lines.

6. The system of claim 1, wherein the power generator is configured to convert solar energy into electrical energy.

7. The system of claim 1, wherein the power generator is configured to convert kinetic energy of ocean waves into electrical energy.

8. The system of claim 1, further comprising a battery configured to store at least a portion of the electrical power generated by the power generator.

9. The system of claim 8, wherein the battery is suspended at a mid-water depth in the marine environment.

10. The system of claim 8, wherein the battery is located on an underwater bottom surface of the marine environment.

11. The system of claim 1, further comprising a wireless communications transmitter configured to transmit information associated with the power generator or the submarine cable.

12. The system of claim 11, wherein the wireless communications transmitter includes a satellite communications transmitter.

13. The system of claim 1, further comprising a radio transmitter configured to broadcast a location associated with the power generator.

14. The system of claim 1, further comprising a light source configured to emit light flashes or pulses.

15. The system of claim 1, wherein the power switching unit includes terminals configured to connect to the power connection cable and segments of the submarine cable.

16. The system of claim 1, further comprising one or more additional power generators.

17. The system of claim 1, wherein the submarine cable includes an optical fiber portion configured to transmit information between two cable landing stations.

18. A system, comprising:
a first power generator configured to generate electrical power in a marine environment;
a first power feed equipment electrically coupled to the first power generator, wherein the first power feed equipment is configured to receive the electrical power generated by the first power generator and deliver, via a first power connection cable, the electrical power generated by the first power generator to a first power switching unit configured to be located in the marine environment;
a second power generator configured to generate electrical power in the marine environment; and
a second power feed equipment electrically coupled to the second power generator, wherein the second power feed equipment is configured to deliver, via a second power connection cable, the electrical power generated by the second power generator to a second power switching unit configured to be located in the marine environment;
wherein the first power switching unit is configured to selectively provide to at least a portion of a submarine cable the electrical power delivered by the first power feed equipment, and the second power switching unit is configured to selectively provide to at least a portion of the submarine cable the electrical power delivered by the second power feed equipment, wherein the submarine cable is routed through the first power switching unit and the second power switching unit.

19. The system of claim 18, wherein the electrical power delivered by the first power feed equipment is provided during a first shunt fault event of the submarine cable and the electrical power delivered by the second power feed equipment is provided during a second shunt fault event of the submarine cable, wherein the first shunt fault event and the second shunt fault event exist at the same time.

20. A method, comprising:
generating electrical power in a marine environment using a power generator; and
delivering the electrical power generated by the power generator, via a power connection cable and using a power feed equipment that is electrically coupled to the power generator and configured to receive the electrical power generated by the power generator, to a power switching unit configured to be located in the marine environment;
wherein the power switching unit is configured to selectively provide to at least a portion of a submarine cable routed through the power switching unit the electrical power delivered by the power feed equipment.

* * * * *